3,168,499
PROCESS FOR ISOLATING CHLORINATED OR
SULFOCHLORINATED POLYOLEFINS
Ludwig Orthner and Franz Landauer, Frankfurt am Main, Martin Reüter, Kronberg, Taunus, and Horst Herzberg, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 5, 1959, Ser. No. 811,005
Claims priority, application Germany May 10, 1958
10 Claims. (Cl. 260—79.3)

The present invention relates to a process for the isolation of chlorinated or sulfochlorinated polyolefins.

Polyolefins, for example polyethylenes, which can be obtained by a high-pressure process or a low-pressure process, such as the Ziegler process, or polypropylenes, can be chlorinated and sulfochlorinated in solvents according to known processes, for example in chlorinated hydrocarbons, such as chloroform or carbon tetrachloride, for example according to the process of U.S. Patent 2,212,786 or German patent application as laid open to public inspection 1,015,603. The products obtained by these processes are, in solid form and free of solvents, more or less similar to rubber. The chlorinated or sulfochlorinated products were up to the present time isolated primarily by precipitation with methanol, for example according to the process of German patent application 1,015,603. This method of isolating, however, has considerable disadvantages on account of the increased toxicity of the solvent mixtures obtained, for example a mixture of carbon tetrachloride and methanol. Another method described in U.S. Patent 2,592,814 consists in forcing a solution of sulfochlorinated polyethylene in carbon tetrachloride through a nozzle into hot water while steam is blown into the solution from another nozzle. Substances, such as gelatin or casein, are dissolved in the water. When working up the sulfochlorinated polyethylene according to this method, small particles are formed that do not stick together, while the solvent evaporates. However, when using gelatin as a dispersing agent, it was found that a lumpy, elastic mass was formed while, when applying casein, small particles were obtained that could without difficulty be isolated from the aqueous solution without sticking together. When testing the mechanical properties it was found, however, that the sulfochlorinated polyethylenes that had been worked up with casein did not possess the good properties as had been expected, which also results from the table given below.

It has also already been proposed in German Patent No. 691,944 to isolate chlorinated rubber from its solutions in organic solvents by introducing the solution gradually into an aqueous precipitating bath containing, if necessary, additions of wetting agents and emulsifiers, while simultaneously distilling off the solvent and taking care that the precipitating chlorinated rubber is immediately discharged from the zone of precipitation.

Now we have found that sulfochlorinated or chlorinated solid homopolymers or copolymers of olefins, for example polymers of monoolefins with 2 to 5 carbon atoms, such as ethylene, propylene, butylene or pentene, as well as copolymers of said olefins, especially copolymers of ethylene and propylene or ethylene and butylene which, as compared with solid chlorinated rubber, rather have a rubber- to leather-like consistence at normal temperature and whose particles easily stick together in the heat, can easily be isolated from their solutions in the form of discrete particles without sticking together and without undergoing a deterioration with regard to fastness to light and heat resistance and without prejudicing their good mechanical properties, when these solutions are introduced into hot water having a temperature within the range of 40° C. to 100° C., depending on the boiling point of the solvent to be distilled, in the presence of inorganic compounds of metals and semi-conductor metals of Groups II, III, IV and V of the Periodic Table, said compounds being insoluble in water, having a large surface, being at most faintly colored, solid and preferably capable of swelling in water, and of organic surface-active compounds containing no salt-forming carboxyl groups, while continuously distilling off the solvent and discharging the precipitated chlorinated or sulfochlorinated polyolefin immediately from the zone of precipitation. The compounds of the metals and semi-conductor metals of Groups II, III, IV and V of the Periodic Table used according to the invention may, for example, be present in the form of their oxides, hydroxides, carbonates, sulfates and silicates.

There may thus be used, for example, magnesium carbonates, aluminum hydroxides, aluminum oxides, aluminum silicates, for example commercial bleaching earths or bentonites, also finely dispersed barium sulfate, silicon dioxide or silica gel, lead oxide (litharge), antimony oxides, titanium dioxide in the presence of an anion-active, cation-active or non-ionic, surface-active substance, for example dibutyl naphthalene sulfo acid, dodecylbenzyl-dimethyl-ammonium-chloride, especially hydroxyethylated alkyl phenols. There are suitably used about 0.1 to 10%, advantageously 0.5 to 2%, respectively, of the inorganic suspended substances and surface-active agents (calculated on the weight of the chlorinated or sulfochlorianted polyolefin to be isolated). Said inorganic solids and/or surface-active substances can by choice either be added to the water, or they may wholly or partially be added to the solutions of the products to be isolated in halogenated aliphatic hydrocarbons, for example, methylene chloride, chloroform, 1.2-dichlorethane and especially carbon tetrachloride. The solution to be introduced into the hot water can also be pre-emulsified with water. As working temperatures there may be applied temperatures ranging from about 45° C. to 100° C. under normal pressure, depending on the boiling point of the solvent, when working up solutions of carbon tetrachloride, it is in general advisable to work at temperatures within the range of 75° C. to 100° C.; the process may, however, also be carried out under reduced or elevated pressure at correspondingly lower or higher temperatures. The discharge of the precipitated, chlorinated or sulfochlorinated polyolefin from the zone of precipitation is effected by rapidly agitated water, for example by stirring.

The process according to the invention offers the advantage that the small particles of the chlorinated or sulfochlorinated polyolefins can easily be obtained in the pure state from the hot or cooled aqueous suspensions which, in the last stage, are free of organic solvents, by filtration on a suction filter or band filter. When comparing this method with that used for the isolation which is brought about by precipitation by means of the addition of methanol, the advantage of the process of the invention resides in the fact that it is not necessary to apply large quantities of methanol; moreover, when using methanol, sticky masses are formed that can be removed from the reaction vessels with difficulty only. It is a special advantage of the process of the invention that halogen is not split off from the substances to be isolated and that they possess better mechanical properties as compared with chlorinated or sulfochlorinated polyolefins isolated by other methods.

The following examples serve to illustrate the invention, but they are not intended to limit it thereto, the parts being by weight:

*Example 1*

120 liters of water, 200 grams of bentonite and 200 grams of a commercial hydroxyethylated octylphenol containing 8 glycol ether units are placed in an agitator vessel (capacity: 300 liters) equipped with descending cooler, thermometer and stirrer, as well as with an inlet tube that scarcely projects into the vessel, while the water is heated to 90° C. From a second agitator vessel a solution of 10 kilos of sulfochlorinated high-pressure polyethylene, having a sulfur content of 1% and a chlorine content of 30%, while the initial high-pressure polyethylene had a reduced viscosity of 1 and a density of 0.92, in 120 liters of carbon tetrachloride is forced by means of air into the hot water at the same rate at which CCl₄ distills off. During this procedure, the temperature of the water shall not drop to a temperature below 75° C. After the total quantity of the solution has been forced into water, stirring is continued at 80° C., to 90° C. until no more carbon tetrachloride distills off, then the aqueous suspension containing the sulfochlorinated polyethylene particles is cooled off and forced on to a suction filter. The filter cake is washed with hot water and dried under reduced pressure at about 40° C.; the yield amounts to 10 kilos of a white, gritty, sulfochlorinated polyethylene.

Comparison of the mechanical strength of sulfochlorinated polyethylene that has been worked up by different methods and subsequently vulcanized:

I. Sulfochlorinated polyethylene worked up by water vapor distillation with the addition of casein (according to the process of U.S. Patent 2,592,814).
II. Sulfochlorinated polyethylene worked up by water vapor distillation according to Example 1.
III. Sulfochlorinated polyethylene worked up by precipitation with methanol.

|     | Tensile strength, kg./cm.² | Elongation at break, percent | Permanent elongation, percent | Impact resilience |
| --- | --- | --- | --- | --- |
| I   | 24 | 370 | 100 | 25 |
| II  | 61 | 660 | >100 | 27 |
| III | 65 | 620 | 90 | 25 |

The products were mixed on the roller according to a standard recipe in known manner with 40 parts by weight of litharge, 3 parts by weight of stearic acid and 2 parts by weight of mercaptobenzthiazole, calculated on 100 parts by weight of sulfochloropolyethylene, and vulcanized within 30 minutes at 160° C. under a pressure of 100 atmospheres gage.

When, instead of the bentonite used, double the amount of a freshly precipitated barium sulfate is applied in the course of the processing according to Example 1, the same result is obtained.

When working according to the afore-described example, there may be used instead of the hydroxyethylated octylphenol the same quantity of a hydroxyethylated nonylphenol with 20 moles of ethylene oxide, or triisobutyl-β-naphthol plus 20 moles of ethylene oxide, or a hydroxyethylated sorbite monolaurate with 20 moles of ethylene oxide, or an oleyl alcohol or octyl alcohol hydroxyethylated with 25 moles of ethylene oxide, or oleic acid hydroxyethylated with 6 moles of ethylene oxide, or a reaction product of one mole castor oil with 40 moles of ethylene oxide, or castor oil plus 40 moles of ethylene oxide, or coconut fatty acid reacted with 2 moles of diethanolamine, or hydroxyethylated product obtained from the amide of the hydrogenated tallow fatty acid with 50 moles of ethylene oxide.

Similar good results in processing are achieved when the aforesaid hydroxyethylated compounds are wholly or partially replaced by the same amount of dibutyl naphthalene sulfonic acid, dodecyl benzenesulfonic acid or an alkyl sulfonate (obtained from a diesel oil fraction possessing to a large extent a straight carbon chain containing about 18 carbon atoms and having a boiling range of 250° to 300° C., by sulfochlorination and saponification with alkalies).

Condensation products of fatty acid chlorides, such as, for example, oleyl acid chloride, with β-oxyethane sulfonic acid or with methyltaurine are equally effective. Also compounds, such as dodecyl benzyl dimethyl ammonium chloride, or octadecenyl trimethyl ammonium chloride, or didodecyl dimethyl ammonium chloride, as well as dodecyl aminoacetate or oleyl aminoacetate exhibit the same action.

Example 2

In a vessel as described in Example 1, there are mixed at a temperature of 85° C. to 90° C. 120 liters of water, 200 grams of a commercial aluminum hydrosilicate (bleaching earth) and 200 grams of a commercial product obtained from 1 mole of diisobutyl phenol plus 12 moles of ethylene oxide. Then a solution of 10 kilos of chlorinated low-pressure polyethylene having a chlorine content of 40%, which had been obtained from a low-pressure polyethylene having a reduced viscosity of 4.1 and a density of 0.95, in 120 liters of carbon tetrachloride is slowly forced under pressure into the above suspension so that the internal temperature does not drop to below 75° C. during the distillation of the carbon tetrachloride. After the total quantity of the chloropolyethylene solution has been forced in under pressure, stirring is continued until no more carbon tetrachloride passes over. Processing takes place as described in Example 1. There are obtained 10 kilos of white chloropolyethylene in granular form.

Instead of the hydroxyethylated alkyl phenol there may, with like success, also be applied a hydroxyethylated naphthol or a hydroxyethylated wax alcohol containing about 10–16 glycol ether units.

Instead of the above-mentioned chlorinated low-pressure polyethylene there may, with the same good result, also be used a chlorinated low-pressure polypentene, for example a chloropentene having a chlorine content of 22%.

Example 3

In a vessel as described in Example 1, a solution of 10 kilos of sulfochlorinated low-pressure polypropylene having a sulfur content of 1.5% and a chlorine content of 7% (the initial low-pressure polypropylene had a reduced viscosity of 0.6) in 100 liters of carbon tetrachloride in which there are still dissolved 50 grams of a hydroxyethylation product obtained from 1 mole of triisobutyl-β-naphthol and 25 moles of ethylene oxide, is forced under pressure into a suspension consisting of 100 liters of water, 250 grams of bentonite and 100 grams of the aforementioned hydroxyethylation product. After the solution of the sulfochlorinated polypropylene has been forced in under pressure, stirring is continued at 95° C. to 100° C. until the total quantity of the solvent has been distilled off. Then the suspension is cooled off and the water is discharged via a suction filter. The white sulfochlorinated polypropylene remains behind on the suction filter in a gritty form, free of carbon tetrachloride. Yield: 10 kilos.

Instead of the sulfochlorinated low-pressure polypropylene there may also be used a sulfochlorinated copolymer obtained from 83 parts by weight of ethylene and 17 parts by weight of propylene and having a content of 1.7% of sulfur and 35% of chlorine. This ethylene/propylene copolymer was obtained by the Ziegler process and had a reduced viscosity of 2.44. There may likewise be applied a sulfochlorinated low-pressure polybutene containing 0.8% of sulfur and 6.4% of chlorine. The polybutene was obtained by the Ziegler process and had a reduced viscosity of 9. There may also be employed a sulfochlorinated polyethylene containing 0.95% of sulfur and 35.2% of chlorine which had been obtained from a polyethylene having a reduced viscosity of 3.0 and a density of 0.96 prepared with the aid of a catalyst system consisting of $SiO_2/Al_2O_3/Cr_2O_3$.

Instead of bentonite there may also be applied the same amount of attapulgite with the same good result.

*Example 4*

In an apparatus as described in Example 1, a solution of 7 kilos of a sulfochlorinated, amorphous ethylene/propylene copolymer obtained by a low-pressure process (ratio ethylene:propylene=55:45 parts by weight, $\eta$ red.=2.6) in 65 liters of carbon tetrachloride in which there are still dissolved 30 grams of the same hydroxyethylated sorbite monostearate cited below in this example containing 15 moles of ethylene oxide, is forced at a temperature of 80° C. to 90° C. into 75 liters of water in which 250 grams of bentonite and 65 grams of a hydroxyethylated sorbite monostearate, containing 15 moles of ethylene oxide, are suspended or dissolved. When the process of adding the solution of the sulfochlorinated copolymer has been terminated, stirring is continued at 90° C. to 100° C. until the total quantity of carbon tetrachloride is distilled off. Then the suspension is cooled off and the water is discharged via a suction filter. The sulfochlorinated copolymer remains behind in the form of a white, gritty product. The water still contained in the product can either be removed in the drying chamber under reduced pressure at 40° C. to 50° C. or by rolling at a slightly elevated temperature, possibly also under reduced pressure.

Instead of the sulfochlorinated ethylene/propylene copolymer there may also be applied a sulfochlorinated copolymer of ethylene/propylene/butene (1) (molar ratio 8:8:1) having a content of 28% of chlorine and 1.3% of sulfur. There may also be used with like success a sulfochlorinated ethylene/butylene copolymer (molar ratio 75:25) containing 0.55% of sulfur and 38.5% of chlorine (the initial copolymer had a reduced viscosity of 5.5). A chlorinated ethylene/butylene copolymer (molar ratio 60:40) containing 62% of chlorine may be used with the same good results (the initial copolymer had a reduced viscosity of 2.9).

All $\eta$ red. values were measured in a solution of 0.5% strength in tetrahydronaphthalene at 130° C.

We claim:

1. A process for the isolation of a member selected from the group consisting of chlorinated and sulfochlorinated polyolefins from solutions in the form of discrete particles, said polyolefins having a rubber to leather-like consistency at normal temperatures, which process comprises introducing a solution of a member selected from the group consisting of chlorinated and sulfochlorinated polyolefins in halogenated aliphatic hydrocarbons into water having a temperature within the range of 40° to 100° C. in the presence of water insoluble inorganic compounds of metals and semi-conductor metals selected from the group consisting of an oxide, hydroxide, carbonate, sulfate and a silicate of a metal selected from the group consisting of magnesium, barium, aluminum, titanium, lead and antimony, said compounds having a large surface, being at most faintly colored, solid and capable of swelling in water, and organic surface-active compounds free of potential salt-forming carboxyl groups selected from the group consisting of anionic, cationic and nonionic surfactants, while continuously distilling off the solvent and precipitating the polyolefin as discrete stable particles from the zone of precipitation.

2. A process according to claim 1 in which the organic surface-active compound is an oxethylated phenol.

3. The process of claim 1 wherein the polyolefin introduced is a chlorinated member selected from the group consisting of homopolymers and copolymers of mono-olefins having 2 to 5 carbon atoms.

4. The process of claim 1 wherein the polyolefin introduced is a sulfochlorinated member selected from the group consisting of homopolymers and copolymers of mono-olefins having 2 to 5 carbon atoms.

5. The process of claim 1 wherein the polyolefin is in solution with carbon tetrachloride which is introduced into water having a temperature of about 75–100° C.

6. The process of claim 1 wherein said inorganic compounds and surface-active compounds are present in an amount of 0.1 to 10% calculated on the weight of the chlorinated and sulfochlorinated polyolefin.

7. The process of claim 6 wherein said compounds are present in an amount of 0.5 to 2%.

8. The process of claim 1 wherein the precipitated polyolefin is discharged from the precipitating zone.

9. The process of claim 1 wherein the surface-active agent is a compound selected from the group consisting of dibutyl naphthalene sulfo acid, dodecylbenzyl-dimethyl-ammonium-chloride, hydroxyethylated octylphenol, hydroxyethylated nonyl-phenol with hydroxyethylated, triisobutyl-β-naphthol, hydroxy-ethylated sorbite monolamate hydroxyethylated oleyl alcohol, hydroxyethylated octyl alcohol, and hydroxyethylated oleic acid.

10. A process for the isolation of a member selected from the group consisting of chlorinated and sulfochlorinated polyolefins and solutions in the form of discrete particles, said polyolefins having a rubber to leather-like consistency at normal temperatures, said members having a chlorine content within the range of 6.4 to 40% and produced from a polyolefin having a reduced viscosity of 0.6 to 9.0 measured in a solution of 0.5% strength in tetrahydronaphthalene at 130° C., which process comprises introducing a solution of a member selected from the group consisting of chlorinated and sulfochlorinated polyolefins in halogenated aliphatic hydrocarbons into water having a temperature within the range of 40° to 100° C. in the presence of water insoluble inorganic compounds of metals and semi-conductor metals selected from the group consisting of an oxide, hydroxide, carbonate, sulfate and a silicate of a metal selected from the group consisting of magnesium, barium, aluminum, titanium, lead and antimony, said compounds having a large surface, being at most faintly colored, solid and capable of swelling in water, and organic surface-active compounds free of potential salt-forming carboxyl groups selected from the group consisting of anionic, cationic and nonionic surfactants, while continuously distilling off the solvent and precipitating the polyolefin as discrete stable particles from the zone of precipitation.

References Cited in the file of this patent

UNITED STATES PATENTS

| 2,523,289 | Frolich | Sept. 26, 1950 |
| 2,640,048 | Beekley | May 26, 1953 |
| 2,809,950 | Bowers | Oct. 15, 1957 |
| 3,005,812 | Wohlers | Oct. 24, 1961 |

FOREIGN PATENTS

| 530,791 | Canada | Sept. 25, 1956 |

OTHER REFERENCES

Whitby: Synthetic Rubber, Wiley and Sons, New York, N.Y. (1954), page 847.